United States Patent Office 3,474,548
Patented Oct. 28, 1969

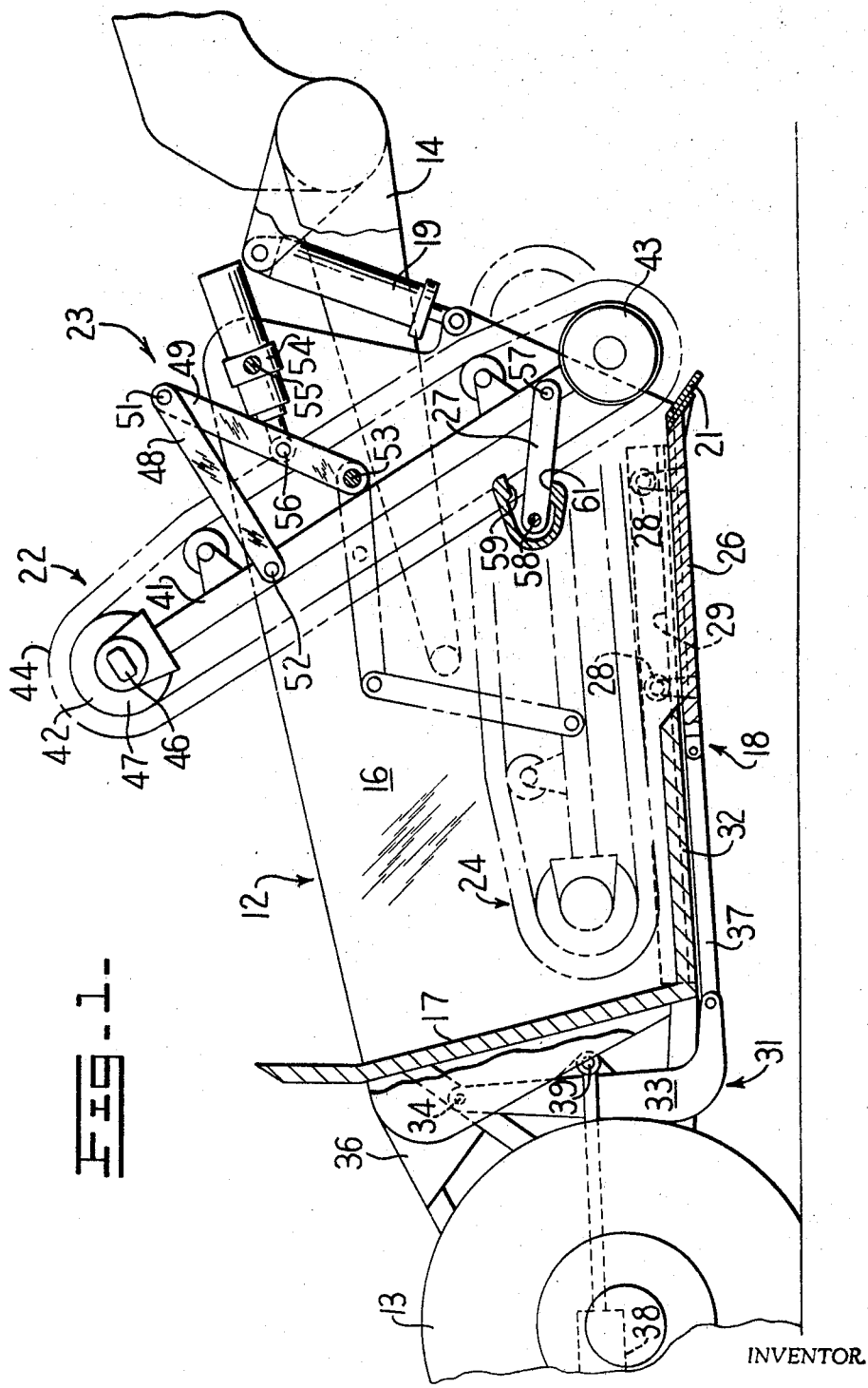

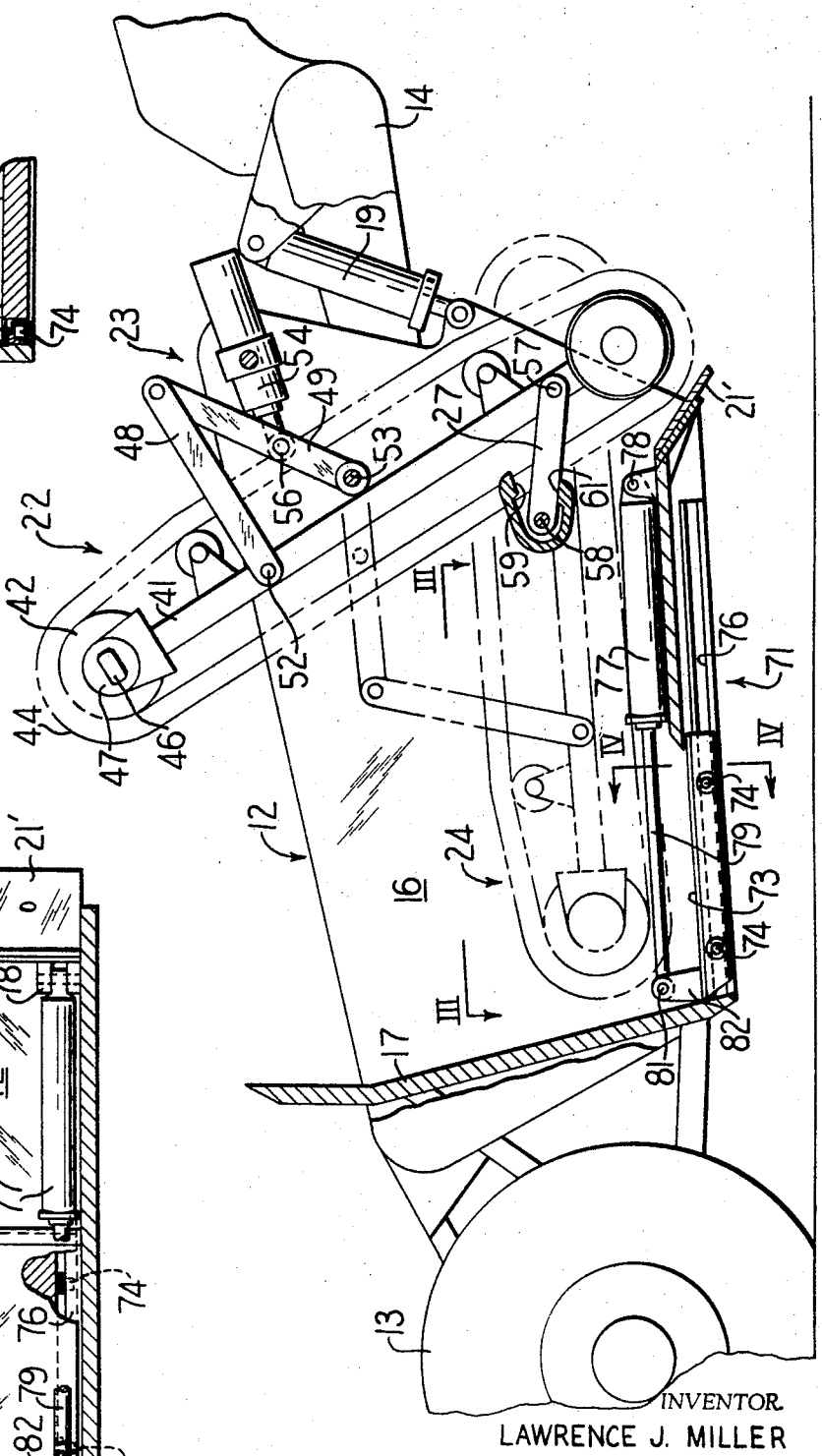

3,474,548
SELF-LOADING SCRAPER HAVING A PIVOTAL ELEVATOR AND MOVABLE FLOOR PORTION FOR UNLOADING
Lawrence J. Miller, Joliet, Ill., assignor to Caterpillar Tractor Co., Peoria, Ill., a corporation of California
Filed July 11, 1967, Ser. No. 652,488
Int. Cl. E02f 3/85; B60p 1/36; B65g 41/00
U.S. Cl. 37—8                     1 Claim

ABSTRACT OF THE DISCLOSURE

A self-loading scraper having a pivotal elevator to assist in unloading as well as loading. A portion of the bowl floor is movable to provide an opening thereat for unloading material from the bowl, the pivotal elevator and movable floor portion cooperating to increase scraper efficiency. A pivotal connection between the elevator and scraper permits vertical motion of the elevator relative to the bowl to further increase efficiency by preventing binding of material between the elevator and scraper bowl.

Cross-references to related applications

U.S. patent application Ser. No. 635,804 entitled "Improved Drive Group For Elevator Top Shaft," filed May 3, 1967 by Larry G. Eftefield and assigned to the assignee of the present invention.

Background of the invention

With the sophistication of self-loading scrapers, their efficiency in earthmoving operations has become of critical importance. Thus, improvements which reduce not only the loading time but also those which reduce unloading time and transport time as well as reducing hold-ups during unloading add greatly to the value of such scrapers. The present invention is particularly concerned with reducing the unloading time of a self-loading scraper and also insuring that there will be no delaying hold-ups during unloading.

The most common means for unloading self-loading scrapers at present is a bulldozing ejector which forms the rear surface of the scraper bowl and moves forwardly through the bowl to unload material therefrom. Although this ejector provides means for positively moving material from the scraper bowl, such scrapers are, for example, commonly susceptible to bridging of material between the ejector and the elevator during unloading to result in a delay and a lowering of operating efficiency.

Summary of the invention

The present invention provides a self-loading scraper with positive unloading means while substantially preventing any delaying hold-ups in the unloading operation thus permitting a significant increase in the operating efficiency of such self-loading scrapers. An elevator assembly is pivotally mounted at the front of the scraper bowl and has means which control the pivotal elevator between an upwardly slanting position to assist in loading and toward and into a position adjacent the bowl floor to positively assist in unloading the scraper bowl. The scraper bowl floor comprises a movable section which provides an opening in the floor for unloading of the scraper bowl.

Brief description of the drawings

FIG. 1 is an elevation of a preferred embodiment of the self-loading scraper with parts shown in section;

FIG. 2 is a similar view showing an alternate embodiment of the self-loading scraper; and FIGS. 3 and 4 are fragmentary sectional views taken on lines III—III and IV—IV respectively of FIG. 2 to more clearly illustrate the configuration of the scraper bowl floor.

Description of the preferred embodiments

Referring now to FIG. 1, a preferred embodiment of a self-loading scraper is shown as comprising a bowl 12 supported at its rear by a pair of wheels one of which is shown at 13 and is pivotally connected to a pair of draft arms, one of which is illustrated at 14, which extend forwardly for connection to a tractor (not shown). The bowl assembly includes a pair of side walls, one shown at 16, a permanent rear wall 17 and a floor generally indicated at 18. The bowl assembly is raised and lowered by means of a pair of hydraulic jacks, one shown at 19, which are pivotally connected between the draft tube and the bowl side walls. A cutting edge 21 is disposed at the forward open end of the bowl assembly upon the bowl floor 18.

To assist both in loading and unloading of the scraper bowl, an elevator assembly 22 is shown in its normal loading position where the elevator is inclined forwardly and downwardly above the cutting edge. The elevator assembly is pivotally connected to the scraper bowl to permit it to move toward and into a position adjacent the scraper bowl floor whereby it may assist in unloading of the scraper bowl as it moves toward the bowl floor. To provide an opening through which material may be unloaded from the bowl, a forward portion 26 of the scraper bowl is disposed to slide rearwardly with respect to the bowl. Further, to permit rocks or large chunks of material to be unloaded from the bowl by the elevator without binding between the inclined elevator and the bowl floor, the lower end of the elevator is pivotally connected to the scraper bowl by a pair of links, one of which is indicated at 27, such that the lower end of the elevator assembly may ride up and over rocks and other large pieces of material either entering or leaving the scraper bowl.

The movable floor portion 26 preferably comprises approximately one-half of the bowl floor area and has a pair of rollers 28 on either side which ride in a track 29 which extends to the rear of the bowl. A floor actuating assembly 31 is connected to the movable floor portion to move it rearwardly on its rollers beneath a stationary floor portion 32 at the rear of the bowl. The floor actuating assembly 31 comprises a similar linkage on either side of the bowl, the linkage including a lever 33 which is pivotally connected at point 34 to the scraper frame 36 at the rear of the bowl. An extension 37 of the lever extends forwardly and is connected to the movable floor portion. To actuate the lever and thus move the forward floor portion, a double-acting hydraulic jack 38 is pivotally connected at 39 to a mid-portion of the lever 33 and extends rearwardly to a connection with the scraper frame 36 (this connection being omitted in the drawing for the sake of simplicity). The elevator assembly typically includes a frame 41, upper drive sprockets 42 and idlers 43 about which an endless chain conveyor 44 is disposed for rotation. The endless chain conveyor is driven in rotation by a hydraulic motor 46 through suitable gear reduction means 47 and the drive sprockets 42. The elevator drive group is of a type for driving the conveyor 44 in either clockwise or counterclockwise rotation about the elevator assembly. The upper elevator support linkage 23 includes a pair of links 48 and 49 which are pivotally connected at 51, one of the links being pivotally connected to the elevator frame by a pivotal connection 52. The other link 49 is pivotally connected at 53 to one of the bowl side walls and has a double-acting hydraulic jack pivotally connected at midpoint 56 thereon and having a trunnion type pivotal connection with the bowl wall as indicated at 55. One of the lower support links 27 is pivotally connected at each side of the elevator frame by a pivotal connection 57 and with one of the bowl side walls at a pivotal connection 58. Upper and lower stops 59 and 61, respectively, are disposed upon each bowl side wall adjacent lower links 27 to limit the upward and downward motion respectively of the lower end of the elevator assembly. Normally the weight of the elevator will cause the support links 27 to ride on the lower stops 61; however, when rocks or other materials act upwardly against the elevator assembly, it may ride upward until the support link 27 contacts the upper stops 59.

In operation, when the scraper bowl has been filled with material, the elevator assembly will be in its tilted position with the movable floor portion in its forwardly extended position. When the elevator bowl is to be unloaded, the hydraulic jacks 38 are retracted to move the levers 33 rearwardly and move the forward floor portion to the rear of the bowl thus providing an opening at the forward end of the bowl for unloading. The elevator drive group is engaged to drive the elevator conveyor in a counterclockwise direction with the hydraulic jacks 54 then being extended to pivot the elevator assembly toward its position 24 adjacent the scraper bowl floor. As the elevator assembly is pivoted downwardly the counterclockwise rotating conveyor acts against material in the bowl moving it forwardly to be unloaded through the opening provided by the movable floor portion 26. Thus, the elevator exerts a positive action on material in the bowl insuring its rapid unloading while the floor opening permits the material to readily pass from the bowl without having to move forwardly past the cutting blade in its normal loading position. The movable nature of the lower elevator support linkage permits greater freedom of motion in the elevator assembly as it is lowered into the bowl thus providing assurance that large rocks and other pieces of material will not bind between the elevator assembly and the scraper bowl floor.

It is to be particularly noted that the above steps and the configuration of the present self-loading scraper serve to reduce unloading time of the scraper and prevent delays during unloading, thus increasing the crtical efficiency rating of the scraper. In particular, the pivotable elevator provides for positive ejection while the movable floor portion in combination with the pivotal elevator decreases the distance material must be moved in the bowl for unloading. In addition, the combination of the pivotal elevator and floor opening tend to eliminate delays caused by binding of material between the elevator and bowl.

After the scraper bowl has been unloaded and while the scraper is being returned to the loading site, the elevator assembly is preferably left pivoted downwardly against the bowl floor to lower the center of gravity of the scraper thus increasing its stability and permitting greater transport speeds.

When the scraper is again ready to commence loading the elevator drive group is reversed to permit clockwise rotation of the elevator conveyor 44 while the hydraulic jacks 54 are partially retracted to pivot the elevator assembly upward to a position midway between its position 24 adjacent the bowl floor and its normal inclined position. With the bowl assembly lowered by means of hydraulic jacks 19 and with the elevator assembly in this position, material may be initially loaded into the scraper bowl over cutting edge 21 without interference from the lower end of the elevator assembly which is then pivoted upwardly somewhat away from the cutting edge. After material is initially loaded into the scraper bowl and the tractive power of the scraper is not sufficient to maintain an efficient rate of loading, the hydraulic jacks 54 are completely retracted to raise the elevator into its normal position with its lower end adjacent the cutting edge to provide maximum assistance in loading material into the scraper bowl. By operating the elevator scraper according to the above method, not only the rate of unloading but the rate of loading and the transport speed of the scraper to its loading site are also increased thus significantly improving the overall operating cycle of the present self-loading scraper.

Referring to FIG. 2, an alternate embodiment of the present invention comprises a similar self-loading scraper with similar elevator assembly 22 and support linkages 23 and 27 but having a different scraper bowl floor arrangement 71. Further, the elevator drive assembly has a hydraulic motor 46' disposed within the elevator assembly with reduction gearing 47' suitable for transmitting driving power from the motor to the drive sprockets. Such a drive group arrangement was described in detail in a copending patent application Ser. No. 635,804.

To describe the floor arrangement of the present elevator scraper, having reference to FIGS. 3 and 4 as well as FIG. 2, a forward portion 72 of the scraper bowl floor is stationary and has the cutting edge 21' connected thereto. A movable rear floor portion 73 has a pair of rollers 74 at either side thereof which ride in tracks 76 extending forwardly toward the cutting edge. A double-acting hydraulic jack 77 is disposed at each side of the bowl floor and is connected to the stationary forward floor portion 72 at connection 78. The rods 79 of the hydraulic jacks extend rearwardly and are connected at 81 to members 82 which are attached to the movable rear floor portion 73. The jacks are preferably shielded or disposed within the bowl side walls to prevent fouling of the jacks by material in the bowl.

The operation as well as the advantages of the present embodiment is substantially similar to that of the embodiment described with reference to FIG. 1. However, during unloading of the scraper bowl, the movable rear floor portion is moved forwardly according to retraction of the hydraulic jacks 77 to a position under the stationary forward floor portion 72. The elevator conveyor 44 is driven in clockwise rotation to move material in the bowl rearwardly to the floor opening provided by the movable floor portion 73 for ejection therethrough. The present embodiment provides an additional advantage in that the elevator drive group is located within the elevator assembly. By this arrangement, the elevator flights may extend substantially the full width of the bowl and the motor and reduction gearing are prevented from contacting the bowl sidewalls or material in the bowl during pivoting of the elevator. In addition, the center of gravity of the elevator assembly is lowered to facilitate pivoting of the elevator assembly within the elevator bowl.

What is claimed is:
1. In a self-loading scraper having a bowl which is open at its forward end, a bowl floor, a cutting edge of the forward open end of the bowl and an elevator assembly disposed at the forward open end of the bowl to assist in loading material into the bowl, the improvement comprising in combination:
   a pivotal connection between the elevator assembly and the scraper bowl generally adjacent the cutting edge,
   means for controlling the pivoted position of the elevator between a generally rearwardly and upwardly slanting position suitable to assist in loading material into the bowl and a position in generally horizontally proximity to the bowl floor permitting the elevator to assist in unloading material from the bowl as it approaches the bowl floor,
   a rearward portion of the scraper bowl floor being movable to provide a rearwardly disposed opening in the bowl floor through which material may be unloaded from the bowl with the assistance of the elevator, said movable floor portion having rollers mounted thereon, a track for supporting said rollers and permitting said movable floor portion to be moved on its rollers beneath an adjacent portion of the scraper bowl floor, and motor means connected between said movable floor portion and the scraper for controlling motion of said movable floor portion.

References Cited

UNITED STATES PATENTS

| | | | |
|---|---|---|---|
| 2,464,098 | 3/1949 | Pittlick | 37—8 |
| 2,791,044 | 5/1957 | Hancock | 37—8 |
| 3,090,139 | 5/1963 | Hancock | 37—8 |
| 3,210,868 | 10/1965 | Liess | 37—8 |
| 3,274,711 | 9/1966 | Johnson et al. | 37—8 |
| 3,308,565 | 3/1967 | Walters et al. | 37—129 |
| 3,331,149 | 7/1967 | Rapp | 37—8 |

ROBERT E. DULFREY, Primary Examiner

EUGENE H. EICKHOLT, Assistant Examiner

U.S. Cl. X.R.

37—133; 198—124; 214—83.26, 509